(12) United States Patent
Kaushik et al.

(10) Patent No.: US 11,640,289 B2
(45) Date of Patent: May 2, 2023

(54) MICROSERVICES CLOUD-NATIVE ARCHITECTURE FOR UBIQUITOUS SIMULATION AS A SERVICE

(71) Applicant: Rockwell Collins, Inc., Cedar Rapids, IA (US)

(72) Inventors: Rishabh Kaushik, North Salt Lake, UT (US); Jeanette M. Ling, Park City, UT (US); Abhishek Verma, Addison, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 326 days.

(21) Appl. No.: 17/001,289

(22) Filed: Aug. 24, 2020

(65) Prior Publication Data
US 2022/0058012 A1  Feb. 24, 2022

(51) Int. Cl.
*H04L 12/24* (2006.01)
*H04L 41/0803* (2022.01)
(Continued)

(52) U.S. Cl.
CPC ............... *G06F 8/65* (2013.01); *G06F 9/547* (2013.01); *H04L 63/029* (2013.01);
(Continued)

(58) Field of Classification Search
CPC ......... G06F 8/65; G06F 9/547; H04L 63/029; H04L 63/062; H04L 63/0884;
(Continued)

(56) References Cited

U.S. PATENT DOCUMENTS 7,711,120 B2 * 5/2010 Kimmel .................. H04L 9/088
380/282
8,887,182 B2  11/2014 Low et al.
(Continued)

FOREIGN PATENT DOCUMENTS

| CN | 107632879 A | | 1/2018 |
|---|---|---|---|
| CN | 110083369 A | * | 8/2019 |
| WO | 2019209231 A3 | | 1/2020 |

OTHER PUBLICATIONS

Emad Heydari Beni et al: "Adaptive and reflective middleware for the cloudification of simulation & optimization workflows", Proceedings of the 16th Workshop on Adaptive and Reflective Middleware, Arm 17, Jan. 1, 2017 (Jan. 1, 2017), pp. 1-6, XP055612720, New York, New York, USA DOI: 10.1145/3152881.3152883, ISBN: 978-1-4503-5168-3.

(Continued)

*Primary Examiner* — Moustafa M Meky
*Assistant Examiner* — Elizabeth Kassa
(74) *Attorney, Agent, or Firm* — Suiter Swantz pc llo

(57) ABSTRACT

A system and method for deploying software is disclosed. The system includes an architecture for deploying simulation software as a service. The architecture includes a client layer. The client layer includes an edge device, a resource manager, an update framework, a firewall, and a key management system. The architecture further includes a control layer communicatively coupled to the client layer, wherein a portion of the control layer is configured within a server. The control layer includes an application programming interface, one or more containers, wherein at least one of the one or more containers is a simulation processing container. The control layer further includes an orchestration node, a continuous integration tool, one or more processors, and a content delivery network module. The architecture further includes a data layer communicatively coupled to the one or more containers.

12 Claims, 3 Drawing Sheets

(51) Int. Cl.
  *G06F 8/65*    (2018.01)
  *G06F 9/54*    (2006.01)
  *H04L 9/40*    (2022.01)
  *H04L 67/1097* (2022.01)
  *H04L 67/51*   (2022.01)

(52) U.S. Cl.
  CPC ........ *H04L 63/062* (2013.01); *H04L 63/0884* (2013.01); *H04L 67/1097* (2013.01); *H04L 67/51* (2022.05)

(58) Field of Classification Search
  CPC ..... H04L 67/1097; H04L 67/51; H04L 63/06; H04L 67/02; H04L 67/1001; H04L 67/34; H04L 63/08; H04L 67/2866; H04L 63/02
  USPC .......................................................... 726/12
  See application file for complete search history.

(56) References Cited

U.S. PATENT DOCUMENTS

| | | | |
|---|---|---|---|
| 9,946,526 B2 | 4/2018 | Fernandez-Ruiz et al. | |
| 10,606,565 B2 | 3/2020 | Douglas et al. | |
| 10,637,562 B1 | 4/2020 | Cleave et al. | |
| 10,691,514 B2 | 6/2020 | McClory et al. | |
| 11,411,733 B1* | 8/2022 | Dailey | H04L 9/3226 |
| 2018/0137174 A1* | 5/2018 | Cahana | G06F 9/455 |
| 2018/0246812 A1* | 8/2018 | Aronovich | G06F 12/0871 |
| 2018/0260201 A1* | 9/2018 | Liu | G06F 11/1471 |
| 2018/0302277 A1 | 10/2018 | Shimamura et al. | |
| 2018/0321918 A1* | 11/2018 | McClory | H04L 41/5041 |
| 2019/0087209 A1 | 3/2019 | Camarda Silva Folco et al. | |
| 2019/0129985 A1* | 5/2019 | Schlarb | G06F 16/2282 |
| 2019/0180006 A1 | 6/2019 | Bojjreddy et al. | |
| 2020/0112487 A1* | 4/2020 | Inamdar | H04L 67/14 |
| 2020/0133689 A1 | 4/2020 | Ferrell et al. | |
| 2020/0167199 A1* | 5/2020 | Zur | G06F 9/5011 |
| 2021/0026614 A1* | 1/2021 | Manoharan | G06F 9/455 |

OTHER PUBLICATIONS

Extended Search Report for European Application No. 21192396.6 dated Jan. 18, 2022, 13 pages.

Wang Sixuan et al.: "A simulation as a service methodology with application for crowd modeling, simulation and visualization", Simulation., vol. 91, No. 1, Dec. 29, 2014 (Dec. 29, 2014), pp. 71-95, XP055877288, ISSN: 0037-5497, DOI:10.1177/0037549714562994, Retrieved from the Internet: URL:http://journals.sagepub.com/doi/full-ml/10.1177/0037549714562994> [retrieved on Jan. 10, 2022].

\* cited by examiner

MICROSERVICES CLOUD-NATIVE ARCHITECTURE FOR UBIQUITOUS SIMULATION AS A SERVICE

BACKGROUND

Software customers increasingly need software that can run on many different platforms and infrastructures. The traditional method of deploying software in a monolithic fashion has become increasingly more time- and cost-consuming as platform diversity and infrastructure diversity increases. Complicating efforts further is the ever-increasing push for computer systems and software packages to offer more intensive capabilities that often require considerable updating. Thus, it is desirable to provide a system or method that avoids the shortcomings of conventional approaches.

SUMMARY

A system is disclosed. In one or more embodiments, the system includes an architecture for deploying simulation software as a service. The architecture includes a client layer. The client layer includes an edge device. The client layer further includes a resource manager communicatively coupled to the edge device configured to provide authentication services and administration services for the edge device. The client layer further includes an update framework communicatively coupled to the resource manager configured to identify software updates. The client layer further includes a firewall communicatively coupled to the resource manager configured to monitor network traffic. The client layer further includes a key management system communicatively coupled to the resource manager configured to manage application keys. The architecture further includes a control layer communicatively coupled to the client layer, wherein a portion of the control layer is configured within a server. The control layer further includes an application programming interface communicatively coupled to the resource manager via an application programming interface gateway. The control layer further includes one or more containers communicatively coupled to at least one of the application programming interface gateway or one of the one or more containers, wherein at least one of the one or more containers is a simulation processing container. The control layer further includes an orchestration node. The control layer further includes a continuous integration tool configured to enable, via the orchestration node, a continuous integration and continuous delivery pipeline. The control layer further includes one or more processors configured to execute instructions provided by the one or more containers. The control layer further includes a content delivery network module communicatively coupled to the edge device configured to deliver content to the edge device. The architecture further includes a data layer communicatively coupled to the one or more containers, wherein the data layer comprises a data layer device configured to store data and transmit data to the one or more containers, wherein the data layer device comprises at least one of a data storage system or a cloud-storage service.

In some embodiments of the system, resource manager communicates with the application programming interface gateway via a representational state transfer application programming interface.

In some embodiments of the system, the system further includes a traffic manager configured to provide domain name system lookup and defines endpoints that allow public addresses to connect with software running on at least one of the server or data storage system.

In some embodiments of the system the one or more processors is at least one of a field programmable gate array, a central processing unit, or a graphics processing unit.

In some embodiments of the system, the system further includes a Policy-as-a-Service configured to decouple policies from application configurations.

In some embodiments of the system, the system further includes a data analytics module configured to at least one of collect user data or perform analysis on the user data.

In some embodiments of the system, the system further includes a tool chain service configured to manage software applications.

In some embodiments of the system, the system further includes a load balancer.

In some embodiments of the system, the system further includes a remote procedure call system.

In some embodiments of the system, the system further includes a coordination and service discovery service.

In some embodiments of the system, at least one or more orchestration nodes are configured to permit communication between microservices.

In some embodiments of the system, the system further includes a service mesh configured to facilitate a communication between microservices.

A method for managing software is also disclosed. In one or more embodiments, the method includes transmitting input data to one or more containers in at least one server from a data storage system via a network, wherein at least one of the one or more containers is a simulation processing container. The method further includes executing, via one or more processors, instructions provided by the one or more containers, wherein the one or more processors produce at least one of administration data or content data based on the input data. The method further includes transmitting, between the one or more containers, the at least one of the administration data or content data, wherein the at least one of the administration data or content data is further processed by at least one of the one or more containers. The method further includes transmitting, via an application programming interface gateway, administration data from the one or more containers to a resource manager, wherein the administration data is monitored by a firewall. The method further includes managing the processing of administration data via the resource manager, wherein the processing of administration data comprises identifying software updates via an update framework; and managing keys. The method further includes transmitting administration data from the resource manager to the edge device. The method further includes transmitting content data from the one or more containers to a content delivery network module. The method further includes transmitting content data from the content delivery module to the edge device.

In some embodiments of the method, the at least one of the one or more containers is an orchestration node configured to orchestrate, via a continuous integration tool, a continuous integration and continuous delivery pipeline.

In some embodiments of the method at least one or more orchestration nodes are configured to permit communication between microservices This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
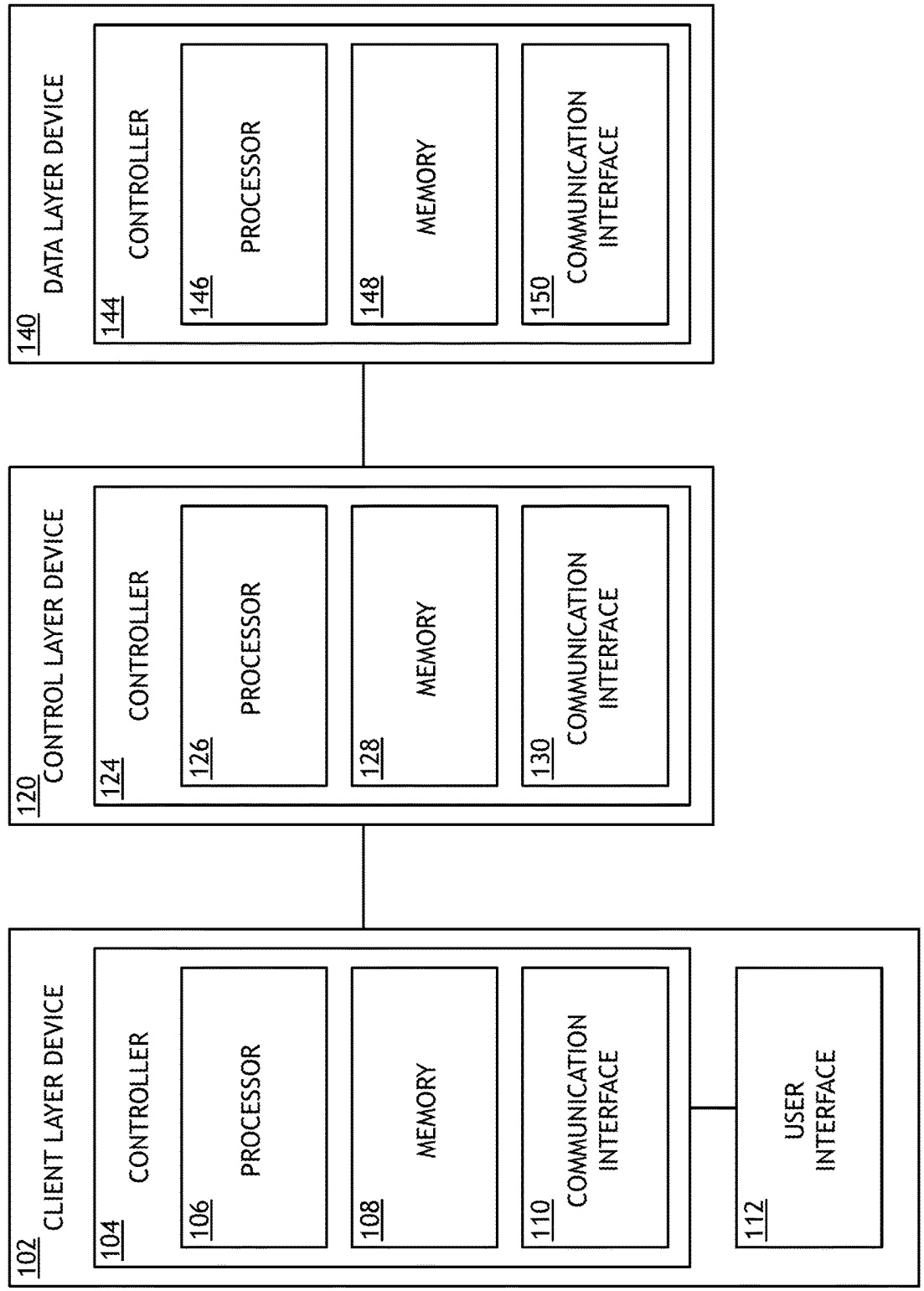
FIG. 1 is a block diagram illustrating componentry for a system for managing software, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "embodiments, one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Figure 2:
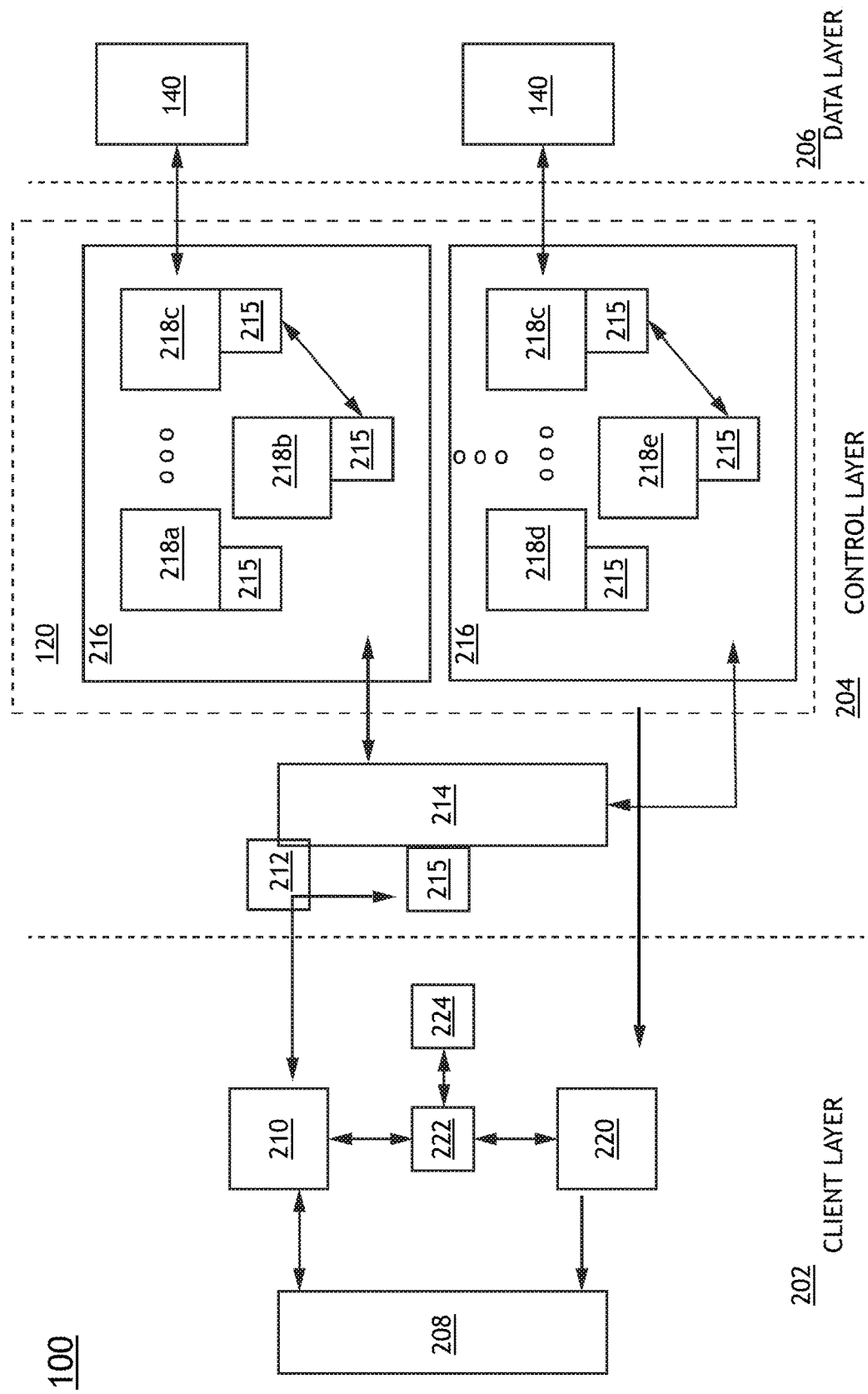
FIG. 2 is a flow chart illustrating the organization of a system for managing software, in accordance with one or more embodiments of this disclosure.
Figure 3:
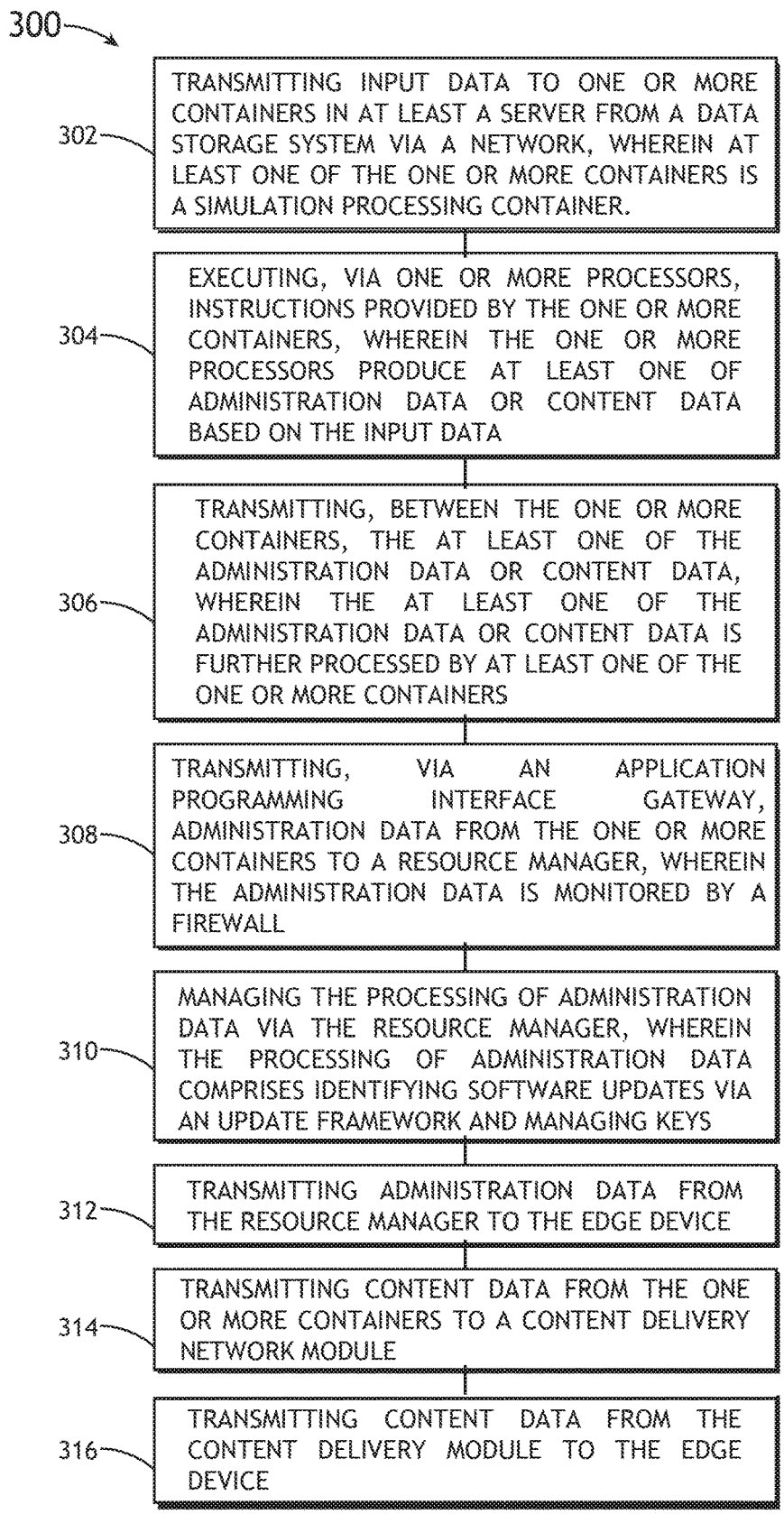
FIG. 3 is a flow diagram illustrating a method of a system for managing software, in accordance with one or more embodiments of this disclosure.

FIGS. 1 through 3 generally illustrate a microservices-based cloud-native architecture for providing simulation software as a service (SiMSaaS). In this disclosure, the system and method, illustrated by the following embodiments, provide for a scheme that allow simulation content to be delivered from a cloud, on-premise server, and/or hybrid-cloud system to be rendered and processed on a client-side device, wherein the delivered software is infrastructure independent.

As the name suggests, simulation software simulates real-world situations through the application of mathematical calculations. Simulation software is often resource intensive, being used for a variety of scenarios including but not limited to aircraft flight simulation and testing of materials. For example, simulation software may be used to predict heat flow for a high friction automotive part, such as a brake disk. As simulation software becomes more powerful (e.g., being more accurate and/or precise in simulating reality), the applications that run the simulation software often require hardware with increased computing capacity, which may run counter to the need by users to running diverse and lower computer computing capacity devices, such as a mobile phone.

Cloud-native computing is software development approach that utilizes cloud computing to create scalable applications within cloud or cloud-like computing environments. For example, a cloud-native computing architecture may use containers. Containers are units of a software application that contain application codes, libraries and systems tools that allow the container to be executed independently, facilitating ease of deployment as well as enabling application scalability within dynamic environments.

Microservices (e.g., a microservice architectures) allow an application to be structured as a collection of separate services that are independently deployable and loosely coupled to other services, for which one or more microservices may be encapsulated within a single container. Similar to the advantages of the container, microservice enable rapid deployment of complex applications.

FIG. 1 is a block diagram of componentry for a system 100 for deploying software as a service, in accordance with one or more embodiments of this disclosure. The system 100 may include at least one client layer device 102 in communication with one or more control layer devices 120. The system may also include one or more data layer devices 140 in communication with the one or more control layer devices 120. Each device 102, 120, 140 includes respective hardware, software, and/or firmware configured to execute the various functions or steps described herein. For example, each device 102, 110 may include at least one respective controller 104, 124, 144. The controller 104, 124, 144 being in communication with the system 100 (e.g., the client layer device 102, the control layer device 120, and/or the data layer device 140). The controller 104, 124, 144 is configured to receive, process, and transmit data within the system 100 (e.g., the client layer device 102, the control layer device 120, and/or the data layer device 140). The controller 104, 124, 144 includes one or more processors 106, 126, 146 configured to perform functions or steps according to program instructions stored in a memory 108, 128, 148. The controller 104, 124, 144 is further configured to include a communication interface 110, 130, 150. The communication interface 110, 130, 150 is configured to facilitate data transfer between components of the device (e.g., the client layer device 102, the control layer device 120, and/or the data layer device 140) and/or other componentry within the system 100.

The processors 106, 126, 146 may include any type of processing elements, including but not limited to integrated circuits. (e.g., application specific integrated circuits (ASIC), field programmable gate arrays (FPGA) a graphics processing unit (GPU), or central processing unit (CPU). For example, the processing element may be configured as an integrated GPU. In another example, the processing element may be configured as a discrete GPU. In another example, the processing element may be configured as a static random-access memory (SRAM) FPGA.

The memory 108, 128, 148 may also include resident or external memory for storing data, executable code, and other resident or external memory generated by the system 100 (e.g., the client layer device 102, the control layer device 120, and/or the data layer device 140). The controller 104, 124, 144 can execute one or more software programs embodied in a non-transitory computer readable medium (e.g., memory 108, 128, 148) that implement techniques described herein. In some embodiments, the main controller 104, 124, 144 is not limited by the materials from which it is formed or the processing mechanisms employed therein and, as such, can be implemented via semiconductor(s) and/or transistors (e.g., using electronic integrated circuit (IC) components), and so forth.

The memory 108, 128, 148 can be an example of tangible, computer-readable storage medium that provides storage functionality to store various data and/or program code associated with operation of the system 100 (e.g., the client layer device 102, the control layer device 120, and/or the data layer device 140) and/or controller 104, 124, 144, such as software programs and/or code segments, or other data to instruct the controller 104, 124, 144, and possibly other components of the system 100, to perform the functionality described herein. Thus, the memory 108, 128, 148 can store data, such as a program of instructions for operating the controller 104, 124, 144 and other components of the system 100 (e.g., the client layer device 102, the control layer device 120, and/or the data layer device 140). It should be noted that while a single memory 108, 128, 148 is described, a wide variety of types of combinations of memory 108, 128, 148 (e.g., tangible, non-transitory memory) may be employed. The memory can be integral with the main controller 104, 124, 144, can comprise stand-alone memory, or can be a combination of both. Some examples of the memory 108, 128, 148 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 110, 130, 150 can be operatively configured to communicate with componentry within the client layer device 102, the control layer device 120 and the data layer device 140. For example, the communication interface 110, 130, 150 may be configured to retrieve data from the controller 104, 124, 144, transmit data for storage in the memory 108, 128, 148, retrieve data from storage in the memory 108, 128, 148, and so forth. The communication interface 110, 130, 150 can also be communicatively coupled with the controller 104, 124, 144 to facilitate data transfer between components of the system 100 and the controller 104, 124, 144.

It should be noted that while the communication interface 110, 130, 150 is described as a component of the client layer device 102, the control layer device 120 and/or the data layer device 140, one or more components of the communication interface 110, 130, 150 may be implemented as external components communicatively coupled to the client layer device 102, the control layer device 120 and/or the data layer device 140 via a wired and/or wireless connection.

According to various embodiments, the client layer device 102 is in communication with the one or more control layer devices 120 via any wired or wireless communication protocol known to the art, such as a direct transmission link, local area network, wireless area network, and the like. Further, the devices 102 and 120 may be communicatively linked via secured or unsecured networking. Similarly, the control layer device 120 is in communication with the one or more data layer device 140 via any wired or wireless communication protocol known to the art, such as a direct transmission link, local area network, wireless area network, and the like. Further, the devices 120, 140 may be communicatively linked via secured or unsecured networking.

In embodiments, multiple levels of devices 102, 120,140 may be implemented within the system (e.g., as in links within a chain or web). For example, the data layer device 140 may be in communication with different data layer device. In another example, the control layer device 120 may be in communication with a different control layer device. Therefore, the above description should not be interpreted as a limitation of the present disclosure, but merely an illustration.

In some embodiments, the client layer device 102 includes a user interface 112 configured to allow a user to interface with the client layer device 102 and/or the system 100. The client layer device 102 may include any type of user interface known including but not limited to displays and input devices. The user interfaces may include one or any user input device known in the art including but are not limited to a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like.

The display may include any display device known in the art. For example, the display may include, but is not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. In a general sense, any display device capable of integration with the user input device (e.g., touchscreen, bezel mounted interface, keyboard, mouse, trackpad, and the like) is suitable for implementation in the present invention.

In embodiments, the control layer device 120 may include any type of computer hardware and/or software that performs the functions of the control layer 204. For example, the control layer device 120 may include a server. For instance, the control layer device 120 may include an on-premise server.

In embodiments, the data layer device 140 may include any type of computer hardware and/or software that performs the functions of the data layer 206. For example, the data layer device 140 may include a data storage system (e.g., an off-premise server). In another example, the data layer device 140 may include a cloud storage service. In should be understood that the control layer device 120 and the data layer device 140 may be configured as the same device. For example, the control layer device 120 and the data layer device 140 may be configured within the same server or server system. In another example, the control layer device 120 and the data layer device 140 may be comprised as a cloud storage service (e.g., the cloud-storage service offering both control layer 204 and data layer 206 services). Therefore, the above description should not be interpreted as a limitation of the present disclosure, but merely an illustration.

In some embodiments, the display is configured to be touch sensitive. In the case of a touchscreen interface, those skilled in the art should recognize that a large number of touchscreen interfaces may be suitable for implementation in the present invention. For instance, the display may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention.

FIG. 2 is a flow chart illustrating the organization of the system 100 for deploying software as a service, in accordance with one or more embodiments of the disclosure. The system 100 may be generally organized into an architecture comprising three layers (e.g., tiers), with each layer encompassing hardware and processes that roughly correspond to the client layer device 102, the control layer device 120 (e.g., comprising at least one server), and/or the data layer device 140. For example, the system 100 includes a client layer 202 having processes and communication protocols that may be performed by the client layer device 102. In another example, the system 100 includes a control layer 204 having processes and communication protocols that may be performed by the control layer device 120. In another example, the system 100 includes a data layer 206 having processes and communication protocols that may be performed by the data layer device 140. It should be understood that processes and and/or communication protocols from any layer (e.g., the client layer 202, the control layer 204, and the data layer 206) may be performed by any device (e.g., client layer device 102, the control layer device, 120 and the data layer device 140), and that a system 100 may have more than one of the client layer device 102, the control layer device 120, or the data layer device 140. For example, a client layer device 102 may execute applications that could also be executed within the control layer device 120. In another example, the client layer device 102 may store data that could also be stored within the data layer device 140. It should also be understood that some processes and/or communication protocols may be carried out by a device different from the client layer device 102, the control layer device 120, or the data layer device 140. For example, a data signal within the system 100 may be sent via a modem that is not a component of the client layer device, the control layer device 120, or the data layer device 140. Therefore, the above description should not be interpreted as a limitation of the present disclosure, but merely an illustration.

In some embodiments, the client layer 202 includes an edge device 208. The edge device 208 is an electronic device with one or more processors and memory that provides an entry point for users to interface with the system 100 (e.g., the edge device 208 may be configured as the client layer device 102). The edge device may be configured as a handheld computer including but not limited to a tablet, a smartphone (e.g., Android, iPhone, Windows, etc.), a phablet, or the like. In addition, the edge device may be configured as a laptop, desktop computer, workstation, or mainframe computer station. In addition, the edge device may be configured as a virtual reality (VR) device including but not limited to an extended reality (XR) device, an augmented reality (AR) device, or a mixed reality device. In addition, the edge device may be configured as an internet or things (IOT) device (e.g., 'smart' electronic device that can receive and apply simulation data).

Additionally, the client layer device 102 may further comprise hypervised entities such as Docker containers and/or virtual machines. For example, a client layer device having modest processing power may utilize the processing power of a cloud-based or on-premise server (e.g., running Docker containers and/or virtual machines) to perform simulation rendering and processing, freeing up processing resources of the client layer device as it displays the simulation.

In some embodiments, the client layer 202 includes a resource manager 210 in communication. The resource manager 210 performs several administration processes for the edge device 208. For example, the resource manager may perform identification resolution, may manage subscriptions, may manage financial transactions, and/or service creation. For instance, the resource manager 210 may manage service creation under a user profile. The system may use any resource manager 210 known. For example, the system 100 may include the Azure Resource Manager from the Microsoft corporation. The resource manager 210 may be included within or in communication with the edge device 208.

In some embodiments, the system 100 includes a middleware service. Middleware is a software that provides services and capabilities to applications that may not be included within the operating system of the system 100. For example, middleware service may include services for data management, application services, messaging, authentication, and application programming interface (API) management. For instance, the client layer 202 may use an open-sourced message-oriented middleware service such as RabbitMQ configured to allow web servers to respond to requests quickly instead of being forced to perform resource-heavy procedures (e.g., allowing an edge device to update quickly).

In another embodiment, the system 100 may further include a security provisioning service. The security provisioning service is a software framework that provides security measures that for mechanisms that identify and download updates to software. For example, the client layer 202 may include and utilize "The Update Framework" (TUF), an open-sourced security provisioning service. For instance, the client layer 202 may utilize TUF to allow developers to maintain the security of a software update system, even against attackers that compromise a repository or one or more signing keys.

In another embodiment, the client layer includes a firewall 212. The firewall 212 monitors and controls incoming and outgoing traffic between the client layer 202 and the control layer 204. The firewall 212 may be any network security system that may be configured to establish a barrier between control layer 204 and client layer 202 traffic. For example, the firewall may be a front-end firewall (e.g., controlling traffic from the control layer 202). The firewall may be configured to check the system 100 for vulnerabilities. For example, if the firewall finds a vulnerability, the firewall may be configured to log data from the vulnerability into the log file and/or dismiss the vulnerability.

In another embodiment, the system 100 includes application programming interface (API) gateway 214. The API gateway acts as a front-end to the API, and may act to receive an API request, enforce throttling and security policies, and other administrative responsibilities for the system 100. For example, the API gateway 214 may manage load balancing of HTTP traffic. In another example, the API gateway 214 may route a request to a specific virtual machine (VM) of a pool of VMs based on the uniform resource locator (URL). In another example, the API gateway 214 may route the request to the same VM based on the state information obtained through cookies. In another example, the API gateway 214 may send data to the client layer to display a customized error page (e.g., with a company brand) in case of service downtime. In another example, the API gateway 214 may manage secure sockets layer (SSL) traffic). In some embodiments, the API gateway 214 is configured as a component of the control layer 204.

In embodiments, the API gateway 214 may communicate with the resource manager 210 via representational state transfer (RESTful) API 215 architecture. For example, the RESTful API may manage transactions between the client layer 202 and the control layer 204, allowing cloud-services from the control layer 204 to be accessed by web browsers running on the edge device 208.

It should be understood that the control layer 204 may include one or more control layer devices 120 that can execute simulation applications and/or store simulation data. For example, the control layer device 120 may be configured as a private server (e.g., an on-premise server). In another example, the control layer device 120 may be configured as a third-party server. For instance, the control layer device 120 may be configured as a third-party cloud service provider. In another example, the control layer device 120 may be configured as a hybrid device, containing aspects of both a private server and a third-party cloud service provider.

In embodiments, the system 100 includes a traffic manager module that provides domain name system (DNS) lookups and defines to allow public internet protocol (IP) addresses to connect with software running on the system 100. For example, the traffic manager module may allow a public IP address to connect with private servers or third-party cloud-services within the system 100. In another example, the traffic manager module may allow a public IP address to connect with virtual machines within the system 100. The traffic manager module may include any known traffic manager module known including but not limited to the Azure Traffic Manager vended by Microsoft corporation.

In some embodiments, the system 100 includes a load balancer configured to allow the edge device 208 to communicate with a single public address (i.e., rather than multiple private IP addresses) to access the system 100. The load balancer may include any load balancer known. For example, the load balancer may include the Azure Load Balancer vended by Microsoft corporation.

In some embodiments, the system 100 is configured to utilize classless inter-domain routing (CIDR) for designating the subnet mask. CIDR notation is generally considered to be more concise in subnet mask designation as compared to the Dotted Decimal notation.

In some embodiments, the system 100 further includes a domain name system (DNS) server configured to determine responses from the responses to queries against a directory service within the system 100. The DNS server may be any DNS server known. For example, the DNS server may be a general-purpose and/or authoritarian DNS server. For instance, the DNS server may be a general-purpose authoritarian DNS server that is backwards-compatible (e.g., backward-compatible to an extensible integration with orchestration nodes 216). Orchestration nodes 216 may include open-source orchestration nodes such as a Kubernetes node. DNS servers that are backward compatible to an extensible integration with orchestration nodes 216 include the open-source DNS server, CoreDNS. For example, the CoreDNS server may be configured to run specific verified modes that will only return an IP address if there is a verified process running within that IP address. For example, a system 100 configured to operate a CoreDNS server that is integrated with Kubernetes nodes (e.g., the CoreDNS server is configured to run a "pods verified" mode), an IP address will only be returned if there is a Kubernetes pod in the specified namespace with that IPS address.

In some embodiments, the system 100 further includes a key management system configured to manage cryptographic keys. The key management system may include any type of key management system. For example, the key management system may be configured as a role-based access control (RBAC) system. For instance, the key management system may include an RBAC system for provisioning and configuration use cases (i.e., centralized authorization). In another instance, the key management system may include an RBAC system for serving/runtime use cases (i.e., decentralized authorization). In another system, the key management system may include an RBAC system that includes aspects of both centralized authorization and decentralized authorization. Key management system used within the system may be open-sourced, proprietary, or commercial key management systems. For example, the key management system may include the open-sourced key management systems Athenz and/or Keycloak.

In embodiments, the control layer 204 includes one or more orchestration nodes 216 that run containerized applications (e.g., applications within containers 218). As discussed herein, containers 218 are units of software that package code and the code's dependencies, enabling the container to 218 load, execute, and update independently of other containers 218. The control layer 204 may use one or more types of a variety of types of containers 128. For example, the control layer 204 may be configured to include Docker containers 218 (i.e., a lightweight, standalone, executable package of software that includes the coding, system tools, system libraries and settings needed to execute the application). Other container services, such as commercially available Platform-as-a-Service (PaaS) services may also be used.

In embodiments, the one or more containers 218 are configured, via an orchestration node 216, to deploy one or more microservices. For example, the orchestration node 216, configured as a physical or virtual machine may deploy one or more single microservices within a container 218. Typically, one microservice is deployed per container. For instance, a Kubernetes node may deploy a container 218 via a Kubernetes pod (i.e., the pod encapsulating the container 218). In this manner, Kubernetes pods may run applications within containers 218, organizing them in a manner that allows the microservices encapsulated within the containers 218 to communicate between each other.

The one or more containers 218 may perform any type of function within the system, (e.g., SimSaaS related function).

For example, one or more of the one or more containers 218a may be configured as an in-house tool container. In another example, one or more of the one or more containers 218b may be configured as a real-time processing application. In another example, one or more of the one or more containers 218c may be configured as a terrain generator. In another example, one or more of the one or more containers 218d may be configured as an artificial intelligence module. In another example, one or more of the one or more containers 218e may be configured as a game engine. It should be understood that the one or more containers 218 may differ based on one or more needs of the system 100. It should also be understood that the system 100 may be configured with any number of orchestration nodes 216 and containers 218 (e.g., as indicated by the ellipses in FIG. 2). Furthermore, at least one of the one or more containers 218 is paired with an API (e.g., a RESTful API). Therefore, the above description should not be interpreted as a limitation of the present disclosure, but merely an illustration.

In some embodiments, the system includes a continuous integration tool configured to enable, when paired with the orchestration node 216, a continuous integration and continuous delivery (CI/CD) pipeline. The CI/CD pipeline is configured to allow small changes in code, and validation of small changes in code) made within the system 100 to be frequently implemented in a consistent and automated fashion. The continuous integration tool may comprise any continuous integration tool known. For example, the continuous integration tool may include the open-source tool Jenkins. In another example, the continuous integration tool may include the tool Bamboo.

In some embodiments, the system 100 is configured to utilize a Docker runtime environment. The Docker runtime environment is configured to facilitate compute unified device architecture (CUDA) based applications inside the one or more containers 218. The Docker runtime environment also facilitates efficient use of system 100 hardware (e.g., CPUs, GPUs, FPGAs, etc.). For example, the Docker runtime environment may be configured to facilitate running applications that are GPU accelerated. For instance, the Docker runtime environment may be configured to facilitate GPU accelerated applications including but not limited to ray-tracing (e.g., for advanced shadows and reflections), high performance computing (e.g., for global illumination), and deep learning (e.g., for computer vision). The Docker runtime environment, may include any known docker runtime environment. For example, the Docker runtime environment may be configured as NVIDIA Docker runtime environment. For instance, the Docker runtime environment may be configured as the NVIDIA Container Toolkit.

In some embodiments, the system 100 is configured to use a containerized FPGA runtime environment. For example, the containerized FPGA runtime environment may be configured to run time-critical or per-frame based applications inside a container, which may then be further accelerated by computer hardware. The containerized FPGA runtime environment may be configured as, but not limited to, the EP2 Real-Time environment vended by Collins Aerospace.

In some embodiments, the system 100 may include a coordination and service discovery service for running one or more orchestration nodes (e.g., a Kubernetes cluster). For example, the coordination and service discovery service may facilitate the running of a Kubernetes cluster on a server (e.g., a private server or a third-party cloud service infrastructure). The coordination and service discovery service may include any type of coordination and service discovery service tool known. For example, the coordination and service discovery service may include CoreDNS. In another example, the coordination and service discovery tool may include the tool Etcd. In another example, the coordination and service discovery tool may include the tool Zookeeper.

In some embodiments, the system 100 includes a remote procedure call RPC framework configured to facilitate the system in executing procedures within different computers (e.g., processors, computing devices) within the system 100. The RPC framework may include any RPC framework known, including but not limited to the Google Remote Procedure Call (gRPC). When implemented, the RPC framework may lower costs associated with serialization, deserialization, automatic type checking, formalizing APIs and TCP management.

In some embodiments, the system 100 includes a service mesh. The service mesh is a dedicated infrastructure layer that facilitates service-to-service communications between microservices (e.g., microservices operating within orchestration nodes). For example, the service mesh may add a proxy (e.g., a sidecar proxy) to each pod of a Kubernetes node. For instance, the proxy may be configured to monitor the Kubernetes API and perform load balancing (e.g. via the RPC) automatically. The service mesh may include any service mesh known. For example, the service mesh may be configured as a Cloud Native Computing Foundation (CNCF) hosted service mesh. For instance, the service mesh may include the service mesh Linkerd.

In some embodiments, the orchestration node 216 (e.g., Kubernetes node and/or cluster) uses distributed key-value store services to store at least one of configuration data state data, or metadata for distributed systems. For example, the key-value store service may provide a canonical hub for cluster/node coordination and state management. The key-value store service may comprise any tool configured to store key-values. For example, the key-value store service may include Etcd.

In some embodiments, the system 100 includes a content delivery network (CDN) module 220. The CDN module 220 is configured to facilitate the delivery of large files and/or streaming content to the edge device 208. For example, the CDN module 220 may be configured to perform caching of files on Points of Presence (PoP) servers located on the system 100 or network (e.g., PoP servers located on the edge of the network).

In some embodiments, the system 100 includes a Policy-as-a-Service. The Policy-as-a-Service is configured to decouple policies from application configurations within the system 100. For example, the Policy-as-a-Service may act as policy middleware within the system 100, wherein the policies within the system 100 are defined within the Policy-as-a-Service and applications within the system 100 query the Policy-as-a-Service to make decisions. The Policy-as-a-service may include any service or policy engine, including but not limited to the open-source tool, Open Policy Agent (OPA). In some embodiments, the Policy-as-a-Service facilitates the system 100 in validating admission controllers for semantic validation of Kubernetes objects before they are created, deleted, or updated.

In some embodiments, the system 100 includes a data analytics module 222. The data analytics module 222 is configured to collect data (e.g., consumer data or user data) and perform data analysis (e.g., statistical analysis, feature engineering, and/or validation) on the collected data. The collected data may then be stored in a hot-tier storage unit 224.

In some embodiments, the system 100 includes a tool chain service for facilitating management of the system 100.

For example, the tool chain service may be configured for release engineering of code products. In another example, the tool chain service may be configured for deployment and lifecycle management of data within the system 100. The tool chain service may comprise any tool chain service known. For example, the tool chain service may include the open-source tool chain service, Cloud Foundry BOSH.

In some embodiments, the data layer 206 may include a hybrid architecture. For example, the data layer 206 may include one or more on-premise private storage servers that communicate with a cloud service provider infrastructure (e.g., using physical and/or Infrastructure-as-a-service (IaaS) componentry through virtual private network (VPN) pathways. The data layer 206 is configured to load and/or store data (e.g., government data and/or proprietary data). For example, the data layer may be used to store government and/or proprietary data in compliance with Business Continuity and Disaster Recovery (BCDR) aspects of the Health Insurance Portability and Accountability Act (HIPAA).

In some embodiments, the data layer 206 may be configured to use any type of query-based language known. For example, the data layer 206 may be configured to use at least one of SQL, NoSQL, or MongoDB.

In some embodiments, the control layer 204 and/or the data layer 206 are configured to use binary large object (BLOB) storage. For example, BLOB storage may be utilized by one more microservices stored within one or more containers, such as container 218c for terrain generation, where data has to be appended). BLOB storage may be facilitated by any BLOB storage tool or service known, including but not limited to Azure BLOB Storage vended by Microsoft.

It should be understood that the system 100 provides SimSaaS that is independent of infrastructure. For example, the software architecture can be supported and deployed for Continuous Integration/Continuous Delivery on any Cloud Service Provider that supports Container integration technology. For example, the system 100 may be deployed onto a cloud service via Azure Container Instance, vended by the Microsoft company. In another example, the system 100 may be deployed onto a cloud service Amazon Elastic Container, vended by the Amazon company. The ability for the system 100 to be independently integrated within any platform avoids vendor lock-in. The potential use of third-party infrastructure by the system reduces the cost of the running the system 100 to processor 126, 146 usage and storage. The system 100 also provides an architecture of loosely coupled and lightweight containers that facilitates easy and rapid updates and maintenance of code.

The architecture of the system 100 provides a cost-effective way to integrate new technologies into the system 100, while still maintaining legacy software, as the system 100 assembles microservices of the legacy and newer programs into containers. For example, the architecture of the system 100 allows collection of customer usage data that may be implemented as part of a future Software License Agreement (SLA) to perform data science, and understand some of the critical aspects of product usage. For example, data collection may be used for the development of improved user interface designs.

In embodiments, the architecture of the system 100 is configured to facilitate a smooth migration pathway for the existing simulation software, while also providing capability of the system 100 to run elastic software. For example, the software will automatically have the ability to scale up (e.g., use more power, CPU use, and/or Storage), scale down (e.g., use less power, CPU use, and/or Storage), scale out (e.g., increase the quantity of resources and/or virtual machines) and/or scale in (e.g., decrease the quantity of resources and/or virtual machines).

In embodiments, the architecture of the system 100 is configured to facilitate the use of orchestration by using JavaScript Object Notation (JSON) based templates for running automation tests at the functional level and unit test level, reducing labor costs. In embodiments, the architecture of the system 100 is configured to utilize Platform-as-a-Service (PaaS) services such as Azure Machine Learning to enhance the functionality of testing products.

FIG. 3 is a flowchart illustrating a method 300 for managing software on and edge device 208 using a microservices-based cloud-native architecture for providing SiM-SaaS. In some embodiments, the method 300 includes a step 302 of transmitting input data to one or more containers 218 in at least one server from a data storage system via a network, wherein at least one of the one or more nodes 216 is a simulation processing container 218. The data storage system comprises any server or cloud-based service that provides supplemental data to the control layer 204 and includes one or more data layer devices 140. The data storage system comprises any server or cloud-based service that defines the data layer 206.

In some embodiments, the method 300 includes a step 304 of executing, via one or more processors, instructions provided by the one or more containers, wherein the one or more processors produce at least one of administration data or content data based on the input data. Content data may include any data, including metadata that conveys information, meaning, purpose, or intent to a user, in either its unprocessed or processed form. Administrative data may include any data utilized by the system 100 that is not content data.

In some embodiments, the method 300 includes a step 306 of transmitting, between the one or more containers, the at least one of the administration data or content data, wherein the at least one of the administration data or content data is further processed by at least one of the one or more containers.

In some embodiments, the method 300 includes a step 308 of transmitting, via an application programming interface gateway 214, administration data from the one or more containers 218 to a resource manager 210, wherein the administration data is monitored by a firewall 212.

In some embodiments, the method 300 includes a step 310 of managing the processing of administration data via the resource manager 210, wherein the processing of administration data comprises identifying software updates via an update framework and/or managing keys.

In some embodiments, the method 300 includes a step 312 of transmitting administration data from the resource manager 210 to the edge device 208. In some embodiments, the method includes a step 314 of transmitting content data from the one or more containers 218 to a content delivery network module 220. In some embodiments, the method includes a step 316 of transmitting content data from the content delivery module 220 to the edge device 208.

It is to be understood that embodiments of the system and methods disclosed herein may be comprised by or be accomplished by physical or virtual componentry. Physical componentry dedicated to and performing a function disclosed herein may be performed by a virtualized component. Correspondingly a virtual component that performs a function disclosed herein may be performed by a dedicated physical component.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
   an architecture for deploying simulation software as a service, comprising:
   a client layer, the client layer comprising:
   an edge device configured to receive simulation content and operate a web browser;
   a resource manager communicatively coupled to the edge device configured to manage subscriptions for the edge device;
   an update framework communicatively coupled to the resource manager configured to identify software updates for programs running on the edge device;
   a firewall communicatively coupled to the resource manager configured to monitor network traffic between the client layer and a control layer; and
   a key management system communicatively coupled to the resource manager configured to manage cryptographic keys;
   the control layer communicatively coupled to the client layer and comprising a cloud-based server, wherein the control layer further comprises:
   an application programming interface communicatively coupled to the resource manager via an application programming interface gateway, wherein the application programming interface is configured to manage transactions between the client layer and the control layer, wherein the application programming interface gateway is configured to enforce security policies for the system, wherein the application programming interface gateway is configured to communicate with the resource manager via representation state transfer, allowing cloud-based services from the control layer to be accessed by the web browser;
   one or more containers communicatively coupled to at least one of the application programming interface gateway or one of the one or more containers, wherein at least one of the one or more containers is a simulation processing container;
   an orchestration node;
   a continuous integration tool configured to implement, via the orchestration node, a continuous integration and continuous delivery pipeline, wherein the continuous integration and continuous delivery pipeline is configured to allow code changes to be implemented in the system in an automated fashion;
   one or more processors configured to execute instructions provided by the one or more containers; and
   a content delivery network module communicatively coupled to the edge device configured to deliver the simulation content to the edge device; and
   a data layer communicatively coupled to the one or more containers, wherein the data layer comprises a data layer device configured to store content associated data and transmit the content associated data to the one or more containers, wherein the data layer device comprises at least one of a data storage system or a cloud-storage service.

2. The system of claim 1, wherein the resource manager communicates with the application programming interface gateway via a representational state transfer application programming interface.

3. The system of claim 1, further comprising a traffic manager configured to provide domain name system lookup and defines endpoints that allow public addresses to connect with software running on at least one of the server or the data storage system.

4. The system of claim 1, wherein the one or more processors is at least one of a field programmable gate array, a central processing unit, or a graphics processing unit.

5. The system of claim 1, further comprising a Policy-as-a-Service configured to decouple policies from application configurations.

6. The system of claim 1, further comprising a data analytics module configured to at least one of collect user data or perform analysis on the user data.

7. The system of claim 1, further comprising a tool chain service configured to manage software applications.

8. The system of claim 1, further comprising a load balancer.

9. The system of claim 1, further comprising a remote procedure call system.

10. The system of claim 1, further comprising a coordination and service discovery service.

11. The system of claim 1, wherein at least one or more orchestration nodes are configured to permit communication between microservices.

12. The system of claim 11, further comprising a service mesh configured to facilitate the communication between the microservices.

* * * * *